F. F. SHERMAN.
VEHICLE WHEEL.
APPLICATION FILED JAN. 21, 1916.
1,258,365.
Patented Mar. 5, 1918.
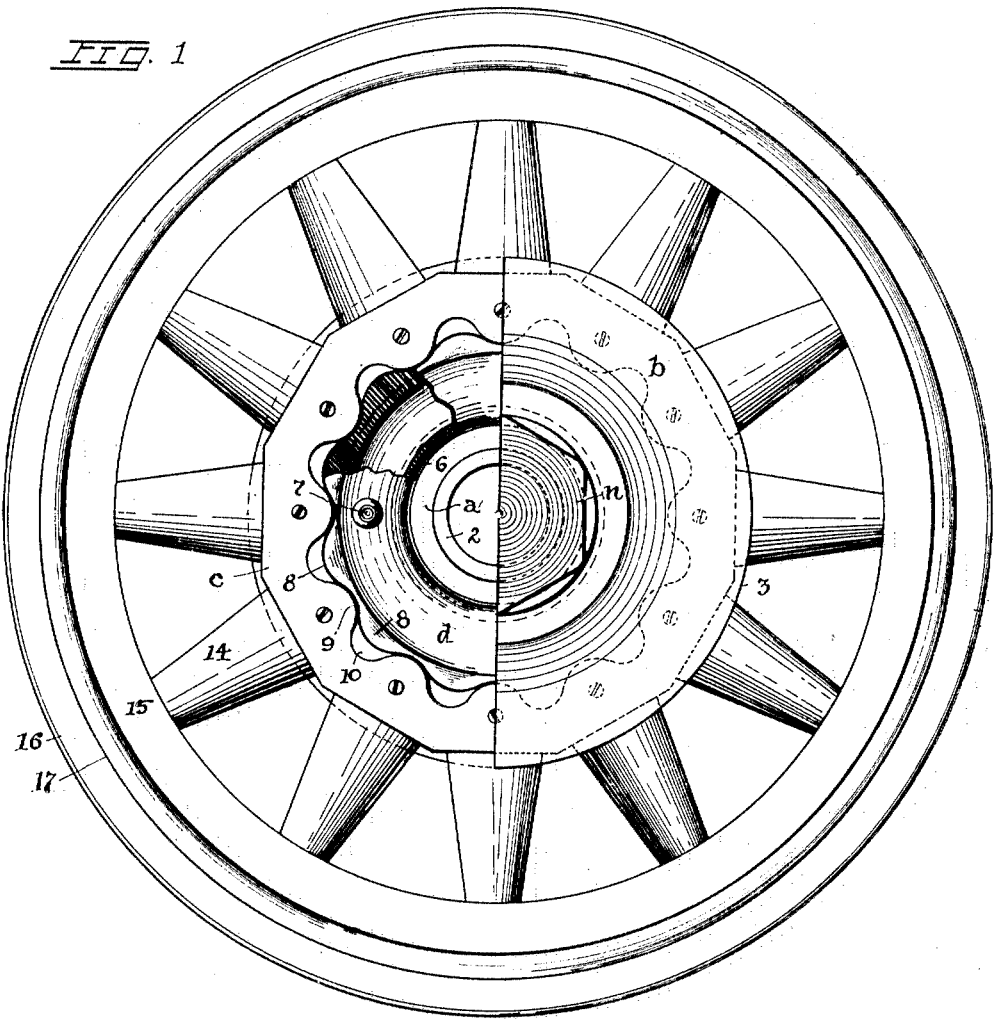
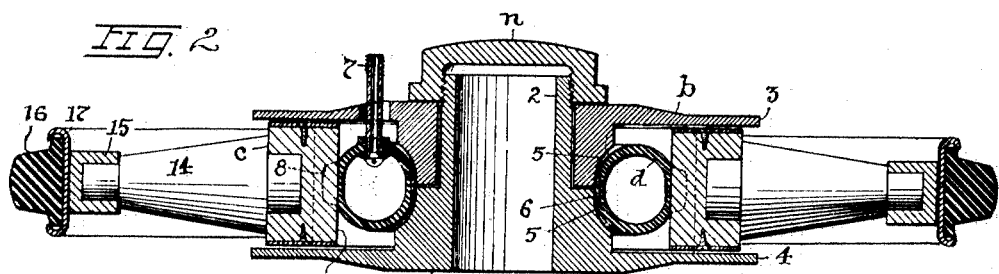
WITNESS
Geo. E. Kricker.
INVENTOR
Forrest F. Sherman
BY
ATTORNEYS

UNITED STATES PATENT OFFICE.

FORREST F. SHERMAN, OF CLEVELAND, OHIO.

VEHICLE-WHEEL.

1,258,365.  Specification of Letters Patent.  Patented Mar. 5, 1918.

Application filed January 21, 1916. Serial No. 73,322.

*To all whom it may concern:*

Be it known that FORREST F. SHERMAN, a citizen of the United States, residing at Cleveland, in the county of Cuyahoga and State of Ohio, has invented certain new and useful Improvements in Vehicle-Wheels, of which the following is a specification.

This invention relates to vehicle wheels provided with means to give resiliency to the tread, all substantially as shown and described and particularly pointed out in the claim.

In the accompanying drawings, Figure 1 is a side elevation partly in section of a wheel embodying the invention, and Fig. 2 is a central cross section thereof.

As thus shown the wheel comprises a practically two-part hub in which the main part or member $a$ has a tubular extension 2 upon which the part or member $b$ is sleeved and locked in place by a cap nut $n$ engaged upon the extremity of said extension and serving to clamp part $b$ in place. Both said parts have radial flanges 3 and 4 respectively, of proportioned width as shown, and a transversely curved seat is provided in the immediate hub of both said parts which receive the inflatable cushioning or resilient pneumatic tube $d$. The inner peripheral portion of said tube has a strip 6 of sheet steel laid therein and adapted to come centrally at its bearing on the curved seat 5 to promote frictional engagement on said seat and also to reinforce the bearing of the tube at that point and to cover the joint, and said tube is provided with a valved nipple 7 as usual to inflate the same.

On its outer periphery the tube $d$ is provided at regular intervals with swells or enlargements 8 which alternate with other swells or enlargements 9 on the inside of the independent ring $c$, thus forming undulating and interlocking surfaces which prevent possible slipping between said parts. The said ring is confined between the flanges 3 and 4 and has such width that it extends outward beyond the tube $d$ at both sides in about the proportions shown, thus providing for more or less lateral expansion of the tube under the weight or load carried by the wheel, and its undulating inner periphery with the humps 9 and scallops or depressions 10 alternating as shown and having the swells 8 of the tube coming in said depressions. The wheel is as effectually locked in this otherwise frictional engagement of said parts as if they were in one piece. When inflated the tube $d$ serves the same purpose as the inner tube in the usual automobile tire so far as resiliency in the wheel is concerned but with the material advantage, in this instance, of very great reduction in size and initial cost and in the important fact that the tube is located where there is no possibility of puncture or injury as in tires generally.

The spokes 14 may be of any preferred pattern or style but are set firmly in sockets or their equivalent in said ring, and have the felly 15 of the wheel mounted thereon as shown. Upon or about the felly or outer rim of the wheel I preferably employ a hard rubber tire 16 supported on a confining band 17, say as shown.

In operation the weight comes upon the rubber tube through the ring $c$, and said ring has a more or less limited play between the flanges 3 and 4 according to the load and the firmness of the tube.

What I claim is:

The construction of wheel described consisting of a hub having a smooth circular transversely curved seat extending about the same and radially disposed flanges at the sides and apart from said seat, in combination with a one piece ring carrying the spokes of the wheel slidably mounted between said flanges and having alternate swells and depressions about its inner periphery, and an inflatable rubber tube mounted on the curved seat on the hub and provided with alternate swells and depressions on its outer periphery corresponding in number and position to the swells and depressions in said ring and in seating relations therewith, the depth of the depressions in the ring being greater than the depth of the swells on the said tube, whereby expanding space is afforded for the tube in service and the resiliency thereof promoted.

In testimony whereof I affix my signature in presence of two witnesses.

FORREST F. SHERMAN.

Witnesses:
 R. B. MOSER,
 GEO. E. KRICKER.